US008627033B2

(12) United States Patent
Martinsen (10) Patent No.: US 8,627,033 B2
(45) Date of Patent: Jan. 7, 2014

(54) STORAGE DEVICE MIGRATION AND REDIRECTION

(75) Inventor: Ronald R. Martinsen, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 355 days.

(21) Appl. No.: 12/972,541

(22) Filed: Dec. 20, 2010

(65) Prior Publication Data

US 2012/0159100 A1 Jun. 21, 2012

(51) Int. Cl.
*G06F 12/00* (2006.01)
*G06F 12/16* (2006.01)

(52) U.S. Cl.
USPC ................. 711/165; 711/2; 711/162; 711/163

(58) Field of Classification Search
USPC ............................... 711/165, 167, 2, 161, 162
See application file for complete search history.

(56) References Cited

U.S. PATENT DOCUMENTS

| 6,549,992 | B1 | 4/2003 | Armangau et al. | |
| 7,032,090 | B2* | 4/2006 | Hulsey | 711/162 |
| 7,171,532 | B2* | 1/2007 | Kodama | 711/165 |
| 7,337,331 | B2* | 2/2008 | Yoshida | 713/193 |
| 7,607,092 | B2 | 10/2009 | Rogers et al. | |
| 7,761,548 | B2 | 7/2010 | Snyder et al. | |
| 8,005,993 | B2* | 8/2011 | Thomas et al. | 710/2 |
| 8,230,193 | B2* | 7/2012 | Klemm et al. | 711/165 |
| 2005/0203892 | A1 | 9/2005 | Wesley et al. | |
| 2006/0129775 | A1* | 6/2006 | Hulsey | 711/162 |
| 2006/0271758 | A1* | 11/2006 | Innan et al. | 711/170 |
| 2007/0016575 | A1 | 1/2007 | Hurst-Hiller et al. | |
| 2007/0067593 | A1* | 3/2007 | Satoyama et al. | 711/165 |
| 2007/0156989 | A1* | 7/2007 | Man et al. | 711/165 |
| 2011/0296101 | A1* | 12/2011 | Kawamura et al. | 711/113 |

OTHER PUBLICATIONS

"Storage Consolidation (Utilisation): Disks and Disk Subsystems", Retrieved at << http://www.symantec.com/connect/articles/storage-consolidation-utilisation-disks-and-disk-subsystems >>, Jul. 27, 2009, pp. 3.
"Windows Home Server Drive Extender Technology", Retrieved at << http://www.davescomputertips.com/articles/server/windows_home_server_drive_extender.php >>, Retrieved Date : Sep. 14, 2010, pp. 3.
Sauter, et al., "Information service patterns, Part 2: Data consolidation pattern", Retrieved at << http://www.ibm.com/developerworks/webservices/library/ws-soa-infoserv2/ >>, Dec. 5, 2006, pp. 17.
Utley, Craig, "Solving Business Problems with SQL Server 2005", Retrieved at <21 http://msdn.microsoft.com/en-us/library/cc966452.aspx >>, Apr. 1, 2005, pp. 8.

\* cited by examiner

*Primary Examiner* — John Lane
(74) *Attorney, Agent, or Firm* — Michael B Dodd; Dodd Law Group (57) ABSTRACT

A network storage system may receive the contents of a storage device attached to a client device to the network storage system. The network storage system may then redirect access to the contents of the client device to the network storage system. The storage device may then be removed or repurposed. Storage device management may be performed by the client device or the network storage system. A policy may be used to define under what circumstances the contents of a storage device may be moved to a network storage system, or data movement may be initiated by a user. Any access permissions or other metadata associated with files on the original storage device can be preserved.

20 Claims, 3 Drawing Sheets

STORAGE DEVICE MIGRATION AND REDIRECTION

BACKGROUND

Many computer systems and networks grow over time. In a business setting, documents may be generated over the course of business. In a home network setting, a user may generate digital images or digital video which may consume storage space. As the storage space is used up, the user may add additional storage devices, such as Universal Serial Bus hard disks, additional hard disks, or other storage devices.

SUMMARY

A network storage system may receive the contents of a storage device attached to a client device to the network storage system, then access to the contents may be redirected on the client device to the network storage system. The storage device may then be removed or repurposed. The storage device management may be performed by the client device or the network storage system in various embodiments. The system may use a policy to define under what circumstances the contents of a storage device may be moved to the network storage system, or the operation may be initiated by a user. The system may also preserve any access permissions or other metadata associated with the files on the original storage device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A network storage device may receive files from a local storage device attached to a client device. The network storage device may store all of the files contained in the local storage device, then add a redirection mechanism on the client device to point to the network storage device.

The network storage device may serve as a mechanism to consolidate various local storage devices on a client device. For example, a user may have one or more attached hard disk storage devices connected through a Universal Serial Bus (USB) connection. The network storage device may move all of the data from the various hard disk devices and then create a link or other redirection mechanism so that the user may access the same data in the same manner, but where the data are stored on the network storage device rather than the previous storage device.

The network storage device may consolidate local storage devices from multiple client devices. Each of the transferred client storage devices may be transferred in such a way that all of the access permissions may be maintained. Even though all of the data are located on a network storage device, each client device may access their own data and may not have access to data associated with other client devices.

The network storage device may provide various data protection services, such as backup services, mirroring or duplication services, or other functions that may protect the data.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
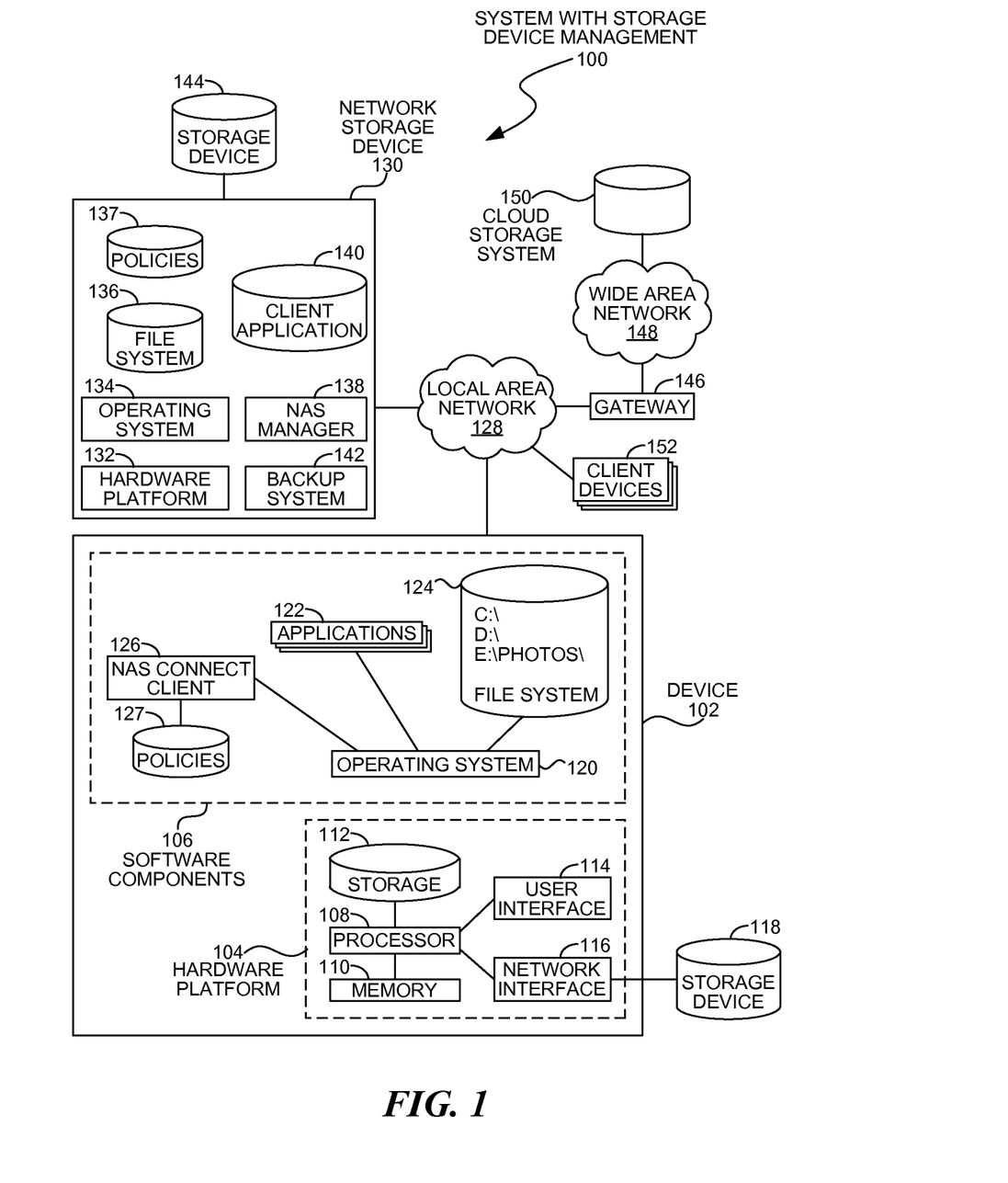
FIG. 1 is a diagram illustration of an embodiment showing a system with a network attached storage mechanism.

FIG. 1 is a diagram of an embodiment 100, showing a system that includes a storage device manager. Embodiment 100 is a simplified example of a local computer system with a local network storage device The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may represent a conventional computer device that may have various local storage devices. In a typical use scenario, a user may have a home computer and may purchase a digital camera. The user may begin taking pictures and may quickly fill up a hard disk or other storage device on the home computer with picture files. Because of the lack of storage space, the user may then purchase a hard disk or other storage device that may be attached by a Universal Serial Bus (USB) connection. Over time, the first USB storage device may become full, so another one may be added.

In the scenario, each of the storage devices may be accessed through a file system on the home computer. In some cases, the various storage devices may be accessed through a drive letter, such as "c:\", or as a directory or device within the file system. At some point in the scenario, the user may purchase a network storage device that may have a large amount of storage capacity. The contents of the USB storage devices may be moved to the network storage device and the home computer's file system may redirect any calls intended for the USB storage device to go to the network storage device instead. In many embodiments, a user may access the file system by using a file system browser.

In some embodiments, the transfer of files and redirection may occur without any user intervention. In one such embodiment, the network storage device may detect a storage device on a client system and move files and redirect requests to the network storage device on an automatic basis. A set of policies may define conditions in which contents of locally attached storage devices may be moved to a network storage device.

The file transfer and redirection process may be performed on removable storage devices. In some embodiments, the storage devices may be hot dockable, meaning that the storage devices may be added and removed while the client computer system may be operational. Some embodiments may only perform a file transfer on removable storage devices and may not perform a file transfer on fixed storage devices.

Examples of removable storage devices may include various solid state and hard disk storage devices. For example, a hard disk storage device may be removably connected using a USB connection. In another example, a solid state storage device, such as those used in cameras, cellular telephones, and other devices may be used. The removable storage devices may include any type of computer storage media.

The file transfer and redirection process may be initiated by a user. For example, an application may give the user a choice to select one or more storage devices to transfer to the network storage device. In one such embodiment, the user may be able to select a local storage device from a graphical user interface and right click or perform other operations to bring up a menu option from which the file transfer and redirection process may be started.

In some embodiments, the files on the storage device may be made unavailable during the file transfer process. In such embodiments, the storage device may be hidden or may be locked from access. Such embodiments may check to determine that all of the files on the storage device are not being accessed by any application prior to transfer.

The file transfer process may transfer all of the contents of the storage device. In some embodiments, the file transfer process may be a bit by bit copy of the storage device where all information on the storage device may be replicated on the network storage device. Such embodiments may copy every detail of the storage device onto the network storage device. Such embodiments may be useful in cases where hidden files, metadata, or other non-visible file related information may be transferred.

In other embodiments, the file transfer process may be a file by file transfer process. In such embodiments, each file may be transferred individually and may be recreated on the network storage device. Such embodiments may be useful in cases where any non-visible file related information may not be used on the network storage device. Other such embodiments may be useful in cases where the file system of the storage device may be different from the file system of the network storage device. For example, some small solid state storage devices used in cameras, cell phones, video cameras, or other devices may use one format for storing files on the device and a second format for storing on the network storage device.

The file transfer process may preserve permissions and other metadata about the files. The permissions may be access permissions that may define read, write, and other access limitations. In some cases, the access permissions may define specific permissions for different users.

In some embodiments, a network storage device may create a virtual hard disk on which to store the files transferred from a local storage device. The virtual hard disk may be an expandable virtual hard disk, and may be expanded in size to accommodate additional files once the local storage device nears capacity. In such an embodiment, the expandable virtual hard disk may allow a user to continue to place files in the same directory structure as was used with the local storage device, but without the storage limitations of the local storage device.

After files are moved from the local storage device to the network storage device, a redirection mechanism may be placed within the local file system to redirect any further read and write operations to the network storage device. In some embodiments, the redirection mechanism may be transparent to the user or applications that may access the files.

In some embodiments, removable storage devices may be accessed through a file system on a local device. The file system may be a set of directories or folders through which files of various types may be organized and accessed. In some cases, files in a removable storage device may be accessed within the file system as a folder or subfolder. In such an embodiment, a redirection mechanism may redirect access requests for contents of the folder to a volume on the network storage device that contains the files.

In some embodiments, a local storage device may be accessed through a letter drive. When the contents of the local storage device may be moved to the network storage device, the letter drive designator may be mapped or redirected to the corresponding volume on the network storage device.

The network storage device may create a new logical volume for each storage device that may be moved. The network storage device may also create a name for each volume. In some embodiments, the name may be created from metadata derived from the local storage device. For example, the local storage device's manufacturer and model number may be used to generate a volume name on the network storage device.

The network storage device may provide storage services to multiple client devices. For each client device, one or more volumes may be created to store files on a local device, then the various client devices may access the volumes over a network connection. In many embodiments, the network storage device may service multiple client devices simultaneously and in parallel. When servicing multiple client devices in parallel, each volume may be made available only to the client device for which it was created. In some such embodiments, the network storage device may allow an administrator to have access to all of the storage volumes on the network storage device.

The network storage device may have additional services, such as backup, data redundancy, data consolidation, and other services that may be performed on various volumes stored on the network storage device.

In some embodiments, a backup system may store a copy of the stored data in another location or on another device. The backup system may operate on all of the volumes stored on the network storage device, or on a subset of the volumes. In some embodiments, a user may be able to designate individual volumes for different types of backup operations. For example, a user may be able to identify some volumes for one type of backup and other volumes for a different type of backup. In some embodiments, the backup settings may be changed for complete volumes, folders or directories within a volume, for all of the data associated with a client device, or globally for all volumes including volumes from multiple storage devices.

One type of backup operation may be a cloud based backup. A cloud based backup may have a backup storage that may be accessed through the Internet or other network connection. In many cases, the cloud based backup may be a remote backup where the backup storage may be off premises.

Another type of backup operation may be a local backup, and may use a tape backup, optical storage, hard disk storage, or other storage mechanism to store a second copy of some or all of the data.

The network storage device may provide data redundancy for some or all of the volumes. Data redundancy may place a volume's data on two or more different storage devices within the network storage device. Data redundancy may minimize the risk of losing data if one of the storage devices, such as a hard disk, were to fail within the network storage device.

In some embodiments, the data redundancy settings may be changed for complete volumes, folders or directories within a volume, for all of the data associated with a client device, or globally for all volumes including volumes from multiple storage devices.

Data consolidation may de-duplicate information or compact data within a volume or between volumes. One mechanism for de-duplication may be to identify blocks of data that are exactly the same and remove one of the blocks of data from storage, freeing a block, and compacting the overall size of the data on the network storage device. In some embodiments, a hash function may be performed on the blocks of data to compare the blocks of data and identify duplicates.

The data consolidation may be performed on multiple volumes. By comparing different volumes and removing duplicate blocks between volumes, a larger amount of space may be saved on the network storage device. In some such embodiments, the volumes from one client may be compacted using volumes from other clients. The overall compacting of the network storage device may be performed while keeping the access permissions and logical separation between the different volumes of different client devices.

The network storage device may provide other services on the data, including encryption, virus scanning, data integrity checking, or other services. In some embodiments, the various services may be changed for complete volumes, folders or directories within a volume, for all of the data associated with a client device, or globally for all volumes including volumes from multiple storage devices.

A client device 102 is illustrated having hardware components 104 and software components 106. The client device 102 as illustrated represents a conventional computing device, although other embodiments may have different configurations, architectures, or components.

In many embodiments, the client device 102 may be a personal computer or code development workstation. The client device 102 may also be a server computer, desktop computer, or comparable device. In some embodiments, the client device 102 may still also be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The client device 102 may have one or more external storage devices 118. The external storage devices 118 may be hard disks, solid state storage devices, optical storage devices, or other storage devices. In many cases, the external storage devices 118 may be hot pluggable or hot swappable, meaning that the storage devices 118 may be added and removed while the device 102 is operational.

The software components 106 may include an operating system 120 on which various applications 122 and services may operate. An operating system may provide an abstraction layer between executing routines and the hardware components 104, and may include various routines and functions that communicate directly with various hardware components.

The operating system 120 may have a file system 122. The file system 122 may be a mechanism for accessing data on the various hardware storage devices, including storage devices 112 and 118. The file system 122 may be used by applications 122 to locate executable and data files, and to create, delete, modify, edit, change properties, and perform other functions on various files.

In some embodiments, an operating system 120 may assign drive letters to different physical or logical storage devices. In such embodiments, a physical storage device may be assigned to a drive letter, directory, or other identifier within the file system 122.

Some storage devices may contain two or more logical volumes. Each logical volume may have a different identifier or location within the file system 122. In such a case, the process of moving files and redirecting access to a network storage device may involve moving all of the logical volumes on the local storage devices, so that the process of moving files and redirecting access may result in the local storage device being freed up or available for repurposing.

In some embodiments, a network attached storage client application 126 may reside on the client device 102. The client application 126 may communicate with the network storage device 130 and coordinate the volume creation on the network storage device 130, movement of files, and configuration of a redirection mechanism. In some embodiments, a majority of the operations may be performed by the client application 126, while in other embodiments, the network storage device 130 may perform a majority of the operations.

The network attached storage client application 126 may use a set of policies 127 to define when and how file transfer and redirection may be performed. The policies 127 may determine under what conditions a file transfer and redirection may be performed. In such embodiments, the client application 126 may cause a file transfer and redirection operation to be performed without any user interaction. Such an embodiment may trigger a file transfer and redirection operation to be performed when a storage device may reach a certain capacity, for example.

A network storage device 130 may be accessible to the client device 102 and clients 152 over the network 128.

The network storage device 130 may have a hardware platform 132, which may be similar to the hardware platform 104 of device 102. The hardware platform 132 may include a processor, random access memory, and storage. In many cases, the hardware storage of the hardware platform 132 may include mirrored hard disks, various Redundant Array of Independent Disks (RAID) configurations, and other configurations that may have a higher fault tolerance than conventional storage media.

The network storage device 130 may have an operating system 134 on which various applications may execute, as well as a file system 136.

A network attached storage manager application 138 may perform some or all of the tasks of detecting a storage device attached to a client device, creating a new volume, and transferring the contents of the storage device into the new volume. The manager application 138 may also cause a redirection mechanism to be configured on a client device.

In some embodiments, the operations of the manager application 138 may be performed using a client application. A client application 140 may be an executable application or service that may be downloaded to a client device, installed, and when executed may respond to commands and requests from the manager application 138.

A backup system 142 may reside on the network storage device 130, and may backup the contents of the storage on the network storage device 130 in various manners. In some cases, the backup system 140 may backup data onto a local device, such as a tape backup, optical storage medium, or another backup storage device. In some cases, the backup system 140 may store data on a cloud storage system 150, which may be accessed through a local area network 128, a gateway device 146, and a wide area network 148, which may include the Internet.

In some embodiments, the network storage device 130 may have externally attached storage devices 144. The externally attached storage devices 144 may be connected to the network storage device 130 and serve as a primary storage device or as a backup storage device.

In some embodiments, the external storage device 144 may be a storage device that may normally be attached to the client device 102. In such an embodiment, a user may plug in a storage device 144 and the network attached storage management application 138 may detect the storage device 144, create a volume, and transfer the files from the storage device 144. In such an embodiment, the user may be presented with a user interface, command line, or other input mechanism whereby the user may select a device to associate with the storage device 144. A redirection mechanism may then be configured on the client device to access the contents of the storage device 144 through the network storage device 130.

In such an embodiment, a user may manually disconnect a storage device from the client 102, then reconnect the storage device to the network storage system 130. Such an embodiment may enable faster transfer times as the file transfer may be performed locally rather than through a network connection.

The network attached storage management application 138 may use a set of policies 137 that may define when and how a file transfer and redirection may occur. The policies may define under what conditions a file transfer and redirection process may be implemented and the configuration settings for how such a process may be performed. In some cases, the policies 137 may define conditions under which a file transfer and redirection process may be performed without user interaction.

Figure 2:
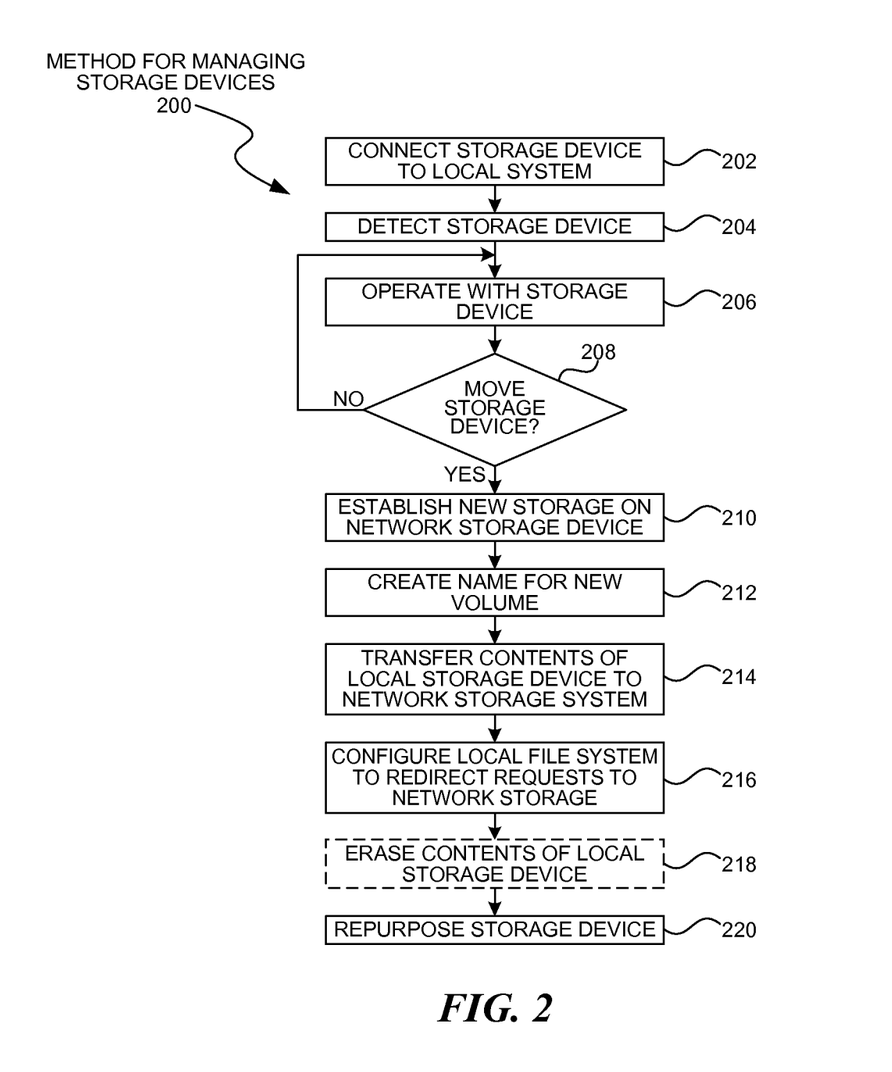
FIG. 2 is a flowchart illustration of an embodiment showing a method for managing storage devices.

FIG. 2 is a flowchart illustration of an embodiment 200 showing a method for managing storage devices. The process of embodiment 200 is a simplified example of a basic process for transferring files from a locally attached storage device, configuring a redirection mechanism, and repurposing the storage device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 202, a storage device may be connected to a local system. The connection may be detected in block 204. After connection, the local system may operate with the storage device in block 206.

In block 208, a condition may be met for transferring the contents of the local storage device. In some embodiments, a policy may indicate when the contents may be moved. In other embodiments, a user may indicate when the contents may be moved.

A new volume may be established on a network storage device in block 210. In some embodiments, the new volume may be a virtual hard disk, while other embodiments may use a logical volume or other mechanisms to manage data stored on a storage device.

A name for the volume may be created in block 212. In some embodiments, a volume name may be automatically generated. In other embodiments, a user may be able to enter or edit a volume name.

In block 214, the contents of the storage device may be transferred to the newly created volume. In block 216, a local file system may be configured to redirect requests to the newly created volume.

In some embodiments, the contents of the local storage device may be erased in block 218. The local storage device may be repurposed in block 220.

Figure 3:
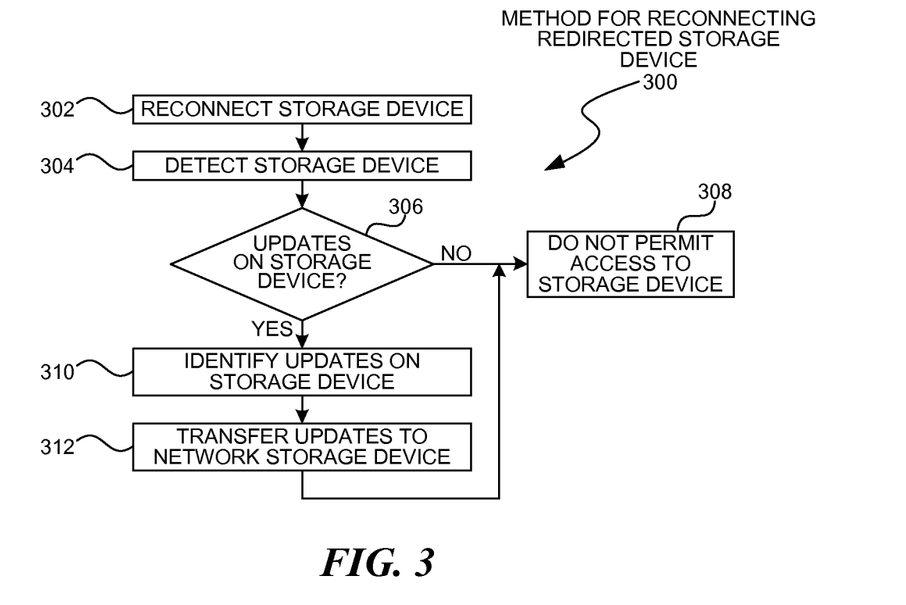
FIG. 3 is a flowchart illustration of an embodiment showing a method for reconnecting a storage device.

FIG. 3 is a flowchart illustration of an embodiment 300 showing a method for reconnecting a storage device. The process of embodiment 300 is a simplified example of a one way synchronization method that may be performed when a storage device is reconnected to a client device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a reconnection process that may be performed when a storage device is reconnected to a client device after a file transfer has been performed. Embodiment 300 may be performed with storage devices may or may not have had their contents erased.

A storage device may be reconnected in block 302. The storage device may be detected in block 304.

If no updates or changes have occurred on the storage device since the contents of the storage device were transferred to a network storage device in block 306, no access may be permitted to the storage device in block 308.

If there are updates or changes on the storage device in block 306, the updates may be identified in block 310 and the updates may be transferred to the network storage device in block 312 using a one way synchronization mechanism. In a one way synchronization system, changes or updates from the local storage device may be moved to the network storage system, but any changes made to network storage system may not be moved back to the local storage system.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. At a network storage device, said network storage device having an attached storage device, said network storage device communicatively coupled to a plurality of client devices via a computer network, a method performed on a computer processor for migrating contents of a plurality of other storage devices to said attached storage device, said method comprising:
consolidating said contents of a plurality of client hardware storage devices at said attached storage device, including for each client storage device included said plurality of client storage devices:
detecting said client hardware storage device is physically attached to a client device, said client device included in said plurality of client devices, said client hardware storage device having contents with access permissions;
determining to move all of said contents to said attached storage device based on a policy;
creating a volume on said attached storage device, said volume for logically separating said contents from other data stored at said attached storage device;
moving all of said contents from said client hardware storage device to said created volume on said attached storage device so as to free up said client hardware storage device for being physical removed from said client device;
maintaining access permissions of said contents at said attached storage device by limiting availability of said created volume to said client device; and
configuring redirection of client device local access requests for said contents to said created volume so that said contents remain accessible to said client device after said client hardware storage device is physically removed from said client device.

2. The method of claim 1, wherein consolidating said contents of a plurality of client hardware storage devices at said attached storage device comprises consolidating contents of a first client hardware storage device attached to a client device with contents of a second client hardware storage device attached to said client device.

3. The method of claim 1, wherein consolidating said contents of a plurality of client storage devices at said attached storage device comprises consolidating said contents of a first client hardware storage device attached to a first client device with contents of a second different client hardware storage device attached to a second different client device.

4. The method of claim 1, said determining being performed by identifying a current condition as defined in a policy.

5. The method of claim 1, said determining being performed by receiving a transfer request from a user.

6. The method of claim 5, said transfer request being an option made available to said user when browsing said storage device in a file browser.

7. The method of claim 1 wherein creating a volume on said attached storage device comprises creating a volume name for said client storage device on said attached storage device.

8. The method of claim 7, said volume name comprising metadata derived from said storage device.

9. The method of claim 1 further comprising subsequent to moving all of said contents from said client hardware storage device to said created volume on attached storage device:
detecting that said client hardware storage device is reconnected to said client device;
determining that said contents of said client hardware storage device have changed; and using a one-way synchronization mechanism to transfer said changed contents to said created volume on said attached storage device.

10. The method of claim 1, wherein consolidating said contents of a plurality of client hardware storage devices at said attached storage device comprises de-duplicating said contents of said plurality of client hardware storage devices at said attached storage device by removing duplicate blocks between created volumes.

11. A system for migrating files, the system comprising:
a processor;
a network connection to a plurality of client devices;
a storage system, said storage system including a network access storage device;
a network attached storage manager, said network attached storage manager configured to:
consolidate said contents of a plurality of client hardware storage devices at said network access storage device, including for each client hardware storage device included in said plurality of client hardware storage devices:
detect said client hardware storage device is physically attached to a client device, said client device included in said plurality of client devices, said client hardware storage device having contents with access permissions;
determine to move all contents of said client hardware storage device to said network access storage device based on a policy;
create a volume on said network access storage device, said volume for logically separating said contents from contents of other stored at said network access storage device;
move all of said contents from said client hardware storage device to said created volume on said network access storage device so as to free up said client hardware storage device for being physically removed from said client device;
maintain access permissions of said contents at said network access storage device by limiting availability of said created volume to said client device; and
configure redirection of client device local access requests for portions of said contents to said created volume so that said contents remain accessible to said client device after said client hardware storage device is physically removed from said client device.

12. The system of claim 11, wherein said network attached storage manager being configured to consolidate said contents of a plurality of client hardware storage devices at said network access storage device comprises said network attached storage manager being configured to consolidate contents of a first client hardware storage device with said contents of a second different client hardware storage device at said network access storage device, said first client hardware storage device and said second different client hardware storage device physically attached to said same client device.

13. The system of claim 11, wherein said network attached storage manager being configured to consolidate said contents of a plurality of client hardware storage devices at said network access storage device comprises said network attached storage manager being configured to consolidate contents of a first client hardware storage device physically attached to a first client device with said contents of a second different client hardware storage device physically attached to a second different client storage device.

14. The system of claim 11 said network attached storage manager being further configured to:
detect that said client hardware storage device is reconnected to said client device;
determine that said contents of said client hardware storage device have changed; and
use a one-way synchronization mechanism to transfer said changed contents to said created volume on said network access storage device.

15. The system of claim 11 wherein said network attached storage manager being configured to redirect access requests for portions of said contents to said created volume comprises said network attached storage manager being configured to redirect local access requests for portions of said contains received at said client device to said created volume.

16. The system of claim 11, wherein said network attached storage manager being configured to consolidate said contents of a plurality of client hardware storage devices at said network access storage device comprises said network attached storage manager being configured to de-duplicating said contents of said plurality of client storage hardware devices at said network access storage device by removing duplicate blocks between created volumes.

17. At a network storage system, said network storage system communicatively coupled to a plurality of client devices, a method for consolidating files from a plurality of different client hardware storage devices at a network accessible storage device, the method comprising:
detecting a first client hardware storage device physically attached to a first client device, said first client hardware storage device being accessed through a first mechanism including a directory structure within an operating system, said first client device included in said plurality of client devices, said first client hardware storage device having first contents with first access permissions;
determining to move said first contents to said network access storage device;
creating a first volume on said network accessible storage device, said first volume for logically separating said first contents from contents of other client storage devices;
moving all of said first contents from said first client hardware storage device to said first created volume;
maintaining said first access permissions of said first contents at said attached storage device by limiting availability of said created first volume to said first client device;
configuring said directory structure to redirect local access requests from the first client device for said first contents to said network accessible storage device so that said first contents remain accessible to said first client device when said first client hardware storage device is physically removed from said first client device;
detecting a second client hardware storage device attached to a second client device, said second client hardware storage device being accessed through a second different mechanism, said second client device included in said plurality of client devices, said second client hardware storage device having second contents with second access permissions;
determining to move said second contents to said network accessible storage device for storage along with said first contents;
creating a second volume on said network accessible storage device, said second volume for logically separating said second contents from said first contents and from contents of other client storage devices;

moving all of said second contents from said second client hardware storage device to said second created volume;

maintaining said second access permissions of said second contents at said attached storage device by limiting availability of said created second volume to said second client device; and configuring said second mechanism to redirect local access requests from the second client device for said second contents to said network accessible storage device so that said second contents remain accessible to said second client device when said second client hardware storage device is physically removed from said second client device.

18. The method of claim 17, wherein said first client device and said second client device are different client devices.

19. The method of claim 18 further comprising:

detecting that said first client hardware storage device is reconnected to said first client device;

determining that said first contents have been changed; and using a one-way synchronization mechanism to transfer said changed first contents to said first created volume.

20. The method of claim 17, wherein said first client device and said second client device are the same client device.

* * * * *